US008643678B1

(12) United States Patent
Jacobs et al.

(10) Patent No.: US 8,643,678 B1
(45) Date of Patent: Feb. 4, 2014

(54) SHADOW GENERATION

(75) Inventors: Aaron Jacobs, Ashfield (AU); Benjamin C. Appleton, Summer Hill (AU)

(73) Assignee: Google Inc., Mountain View, CA (US)

( * ) Notice: Subject to any disclaimer, the term of this patent is extended or adjusted under 35 U.S.C. 154(b) by 549 days.

(21) Appl. No.: 12/975,690

(22) Filed: Dec. 22, 2010

(51) Int. Cl.
*G09G 5/00* (2006.01)
*G09G 5/02* (2006.01)
*G06T 15/50* (2011.01)
*G06T 15/60* (2006.01)

(52) U.S. Cl.
USPC ............... 345/648; 345/589; 345/426

(58) Field of Classification Search
USPC .......................... 345/648, 589, 426
See application file for complete search history.

(56) References Cited

U.S. PATENT DOCUMENTS

| 5,237,647 | A | * | 8/1993 | Roberts et al. | 345/419 |
| 5,812,072 | A | * | 9/1998 | Masters | 341/55 |
| 5,835,223 | A | * | 11/1998 | Zwemer et al. | 356/600 |
| 5,864,342 | A | * | 1/1999 | Kajiya et al. | 345/418 |
| 5,870,097 | A | * | 2/1999 | Snyder et al. | 345/426 |
| 6,014,472 | A | * | 1/2000 | Minami et al. | 382/285 |
| 6,362,822 | B1 | * | 3/2002 | Randel | 345/426 |
| 6,664,962 | B1 | * | 12/2003 | Komsthoeft et al. | 345/426 |
| 2002/0018063 | A1 | * | 2/2002 | Donovan et al. | 345/426 |
| 2002/0124035 | A1 | * | 9/2002 | Faber et al. | 708/400 |
| 2003/0112237 | A1 | * | 6/2003 | Corbetta | 345/426 |
| 2003/0218610 | A1 | * | 11/2003 | Mech et al. | 345/426 |
| 2004/0125103 | A1 | * | 7/2004 | Kaufman et al. | 345/419 |
| 2005/0264819 | A1 | * | 12/2005 | Arnz et al. | 356/446 |
| 2007/0040832 | A1 | * | 2/2007 | Tan et al. | 345/426 |
| 2009/0304265 | A1 | * | 12/2009 | Khan et al. | 382/154 |
| 2010/0134634 | A1 | * | 6/2010 | Witt | 348/181 |
| 2010/0134688 | A1 | * | 6/2010 | Moriwake | 348/586 |

\* cited by examiner

*Primary Examiner* — David T Welch
(74) *Attorney, Agent, or Firm* — Dority & Manning, P.A.

(57) ABSTRACT

Methods, systems, and apparatus, including computer programs encoded on a computer storage medium, for generating shadows. In one aspect, a method includes identifying a two-dimensional image representing an icon and a two-dimensional image representing a light source, applying an affine transformation to a transparency channel of the image representing the icon, the affine transformation projecting pixels of the transparency channel into three-dimensional space, and generating a field of pixels representing a shadow cast by the icon by computing a portion of the light source that is visible to pixels of the field by subtracting rows of a matrix that represents the affine transformation from rows of a matrix that represents the transparency channel of the light source image, and computing brightness of each of the generated pixels of the field based at least partly on the computed portion of the visible light source.

15 Claims, 7 Drawing Sheets

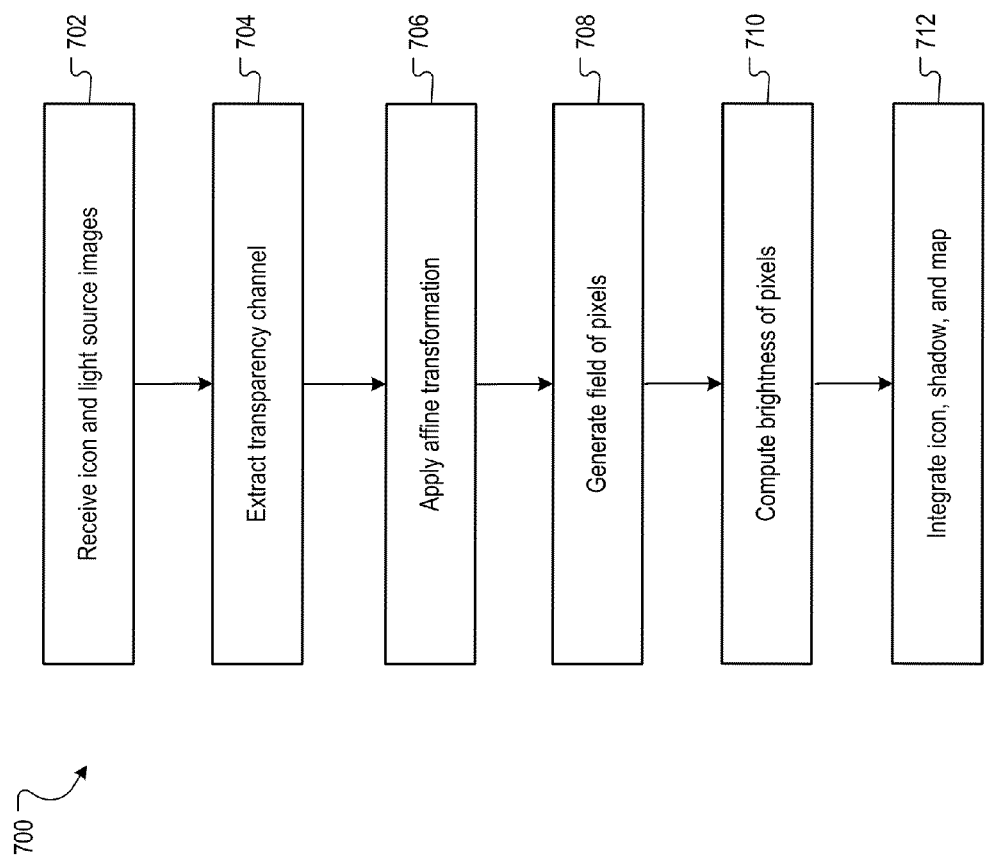

SHADOW GENERATION

BACKGROUND

The present disclosure relates to digital data processing and, in particular, to generating shadows in images.

Online graphics, such as geographic maps, can be displayed on a two-dimensional medium such as a computer screen. Computer systems can simulate a three-dimensional appearance of the map by using different techniques. For example, map elements such as icons representing buildings can be placed at angles to simulate perspective. Also, the map elements can be shaded in ways that make them appear three-dimensional, for example, by reacting to simulated light sources in the vicinity of the map.

SUMMARY

In general, one aspect of the subject matter described in this specification can be embodied in method that a includes identifying a two-dimensional image representing an icon and a two-dimensional image representing a light source, applying an affine transformation to a transparency channel of the image representing the icon, the affine transformation projecting pixels of the transparency channel into three-dimensional space, and generating a field of pixels representing a shadow cast by the icon by computing a portion of the light source that is visible to pixels of the field by subtracting rows of a matrix that represents the affine transformation from rows of a matrix that represents the transparency channel of the light source image, and computing brightness of each of the generated pixels of the field based at least partly on the computed portion of the visible light source. Other embodiments of this aspect include corresponding systems, apparatus, and computer program products.

These and other embodiments can each optionally include one or more of the following features. Subtracting the rows of the affine transformation from the rows of the transparency channel of the light source image includes computing first run-length encodings computed based at least partly on rows of the matrix representing the transparency channel of the light source image, and computing second run-length encodings computed based at least partly on rows of the matrix representing the affine transformation. The method includes computing the first run-length encodings and the second run-length encodings each a number of times equal to a number of pixels in the field. The field of pixels includes a matrix comprising a number of rows equal to a number of rows in the matrix representing the affine transformation. Computing the brightness of each of the generated pixels of the field based at least partly on the computed portion of the visible light source includes assigning a brightness value to each pixel of the field. Identifying the image includes receiving the image from a location specified by a uniform resource locator (URL).

Particular embodiments of the invention can be implemented to realize one or more of the following advantages. Images can be placed over a map on the fly and have a three-dimensional shadow effect. Shadows can be generated quickly using a run-length encoding method.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

FIG. 7 is a flowchart of an example technique for generating a shadow from a marker image.

Like reference numbers and designations in the various drawings indicate like elements.

DETAILED DESCRIPTION

A map image shown on a display device can be made to look more like a physical map (e.g., a traditional paper map) by modifying the map graphics to simulate a three-dimensional (3-D) appearance. For example, if the map has graphical markers indicating places of interest on the map, the markers can be augmented with shadow graphics to give the appearance of a marker hovering above the map and casting a shadow over the map.

Sometimes the shape of the marker is not known in advance of generating the map image, so the shadow cannot be created in advance. For example, in some cases a map image generator accepts a custom graphical marker provided at the time the map image is generated. In order to include shadows in the map image, the map image generator can create a custom shadow "on the fly" based on the custom graphical marker. In various implementations, this can be accomplished by generating a 3-D model of the graphical marker, a model of a volumetric light source (e.g. the sun or a bright light bulb), and a field of pixels representing the shadow. The brightness of each pixel of the field is calculated by computing the portion of the volumetric light source visible behind the graphical marker.

Figure 1:
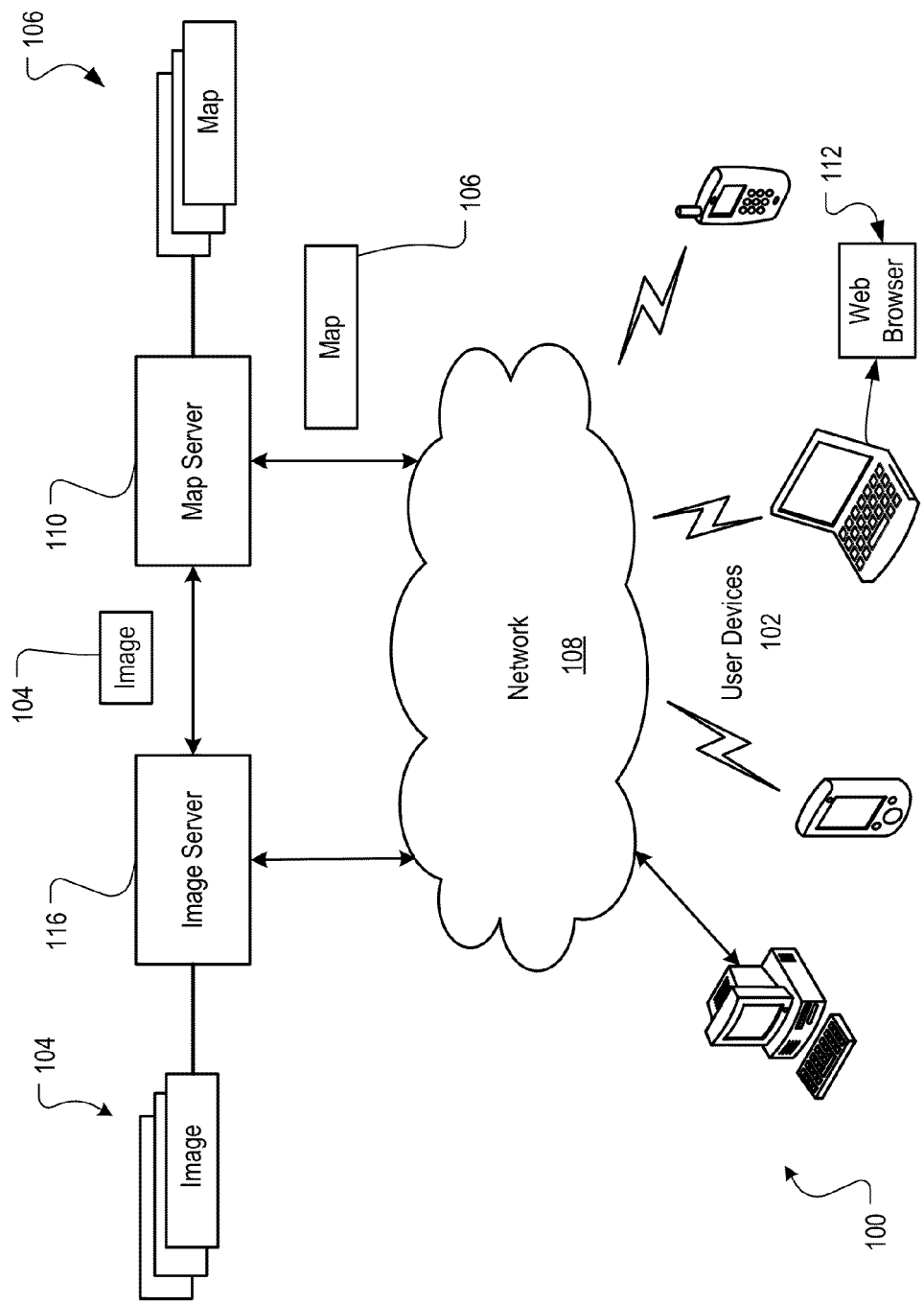
FIG. 1 is a block diagram of an example system.

FIG. 1 is a block diagram of an example system 100. The system 100 facilitates the serving of content items for display on user devices 102 (e.g., data processing apparatus such as personal computers, laptop computers, smart phones, tablet computers, and Internet-enabled televisions). For example, content items may include resources such as images 104 and maps 106.

The maps 106 can be representations of regions, for example, a political region such as a city, state, or country, or a combination or subset of these things. The maps 106 can include geographical features such as streets, roads, highways, natural elements such as mountains and rivers, and points of interest such as buildings and landmarks. The maps 106 can be to scale or not to scale. The maps 106 can be pre-generated images, or the maps 106 can be in a non-image format such as a markup language that can be used to generate an image, or the maps 106 can be in some other format, or the maps 106 can be some combination of these. The maps 106 can indicate surface features, e.g., topographical maps.

The images 104 can be in any file format, such as JPEG, GIF, PNG, TIFF, a vector drawing format, another kind of format, or some combination of these. The images 104 can be represented on a display device in the form of pixels, for example, square pixels as displayed on an electronic display. The images 104 can have an intended size of display on a display device and the size of display can range from a few millimeters to several centimeters or more. The images 104 can have hue/color, or they can lack hue/color (e.g., black & white images), or the images 104 can be some combination of these. Images 104 having hue/color can have a color model such as RGB, CIE, or CMYK.

The images 104 can be used in association with the maps 106. For example, a map 106 can include a feature of interest (e.g., of interest to a user viewing the map), and an image 104 can be a marker for indicating or highlighting the feature of interest.

Images 104 and maps 106 can be provided to user devices 102 through the network 108, for example. The network 108 can be a wide area network, local area network, the Internet, or any other public or private network, or combinations of these.

A map 106 can be requested from a map server 110 that provides a map 106 to a user device 102 when the user device 102 communicates with the map server 110 to request the map 106. An image 104 can be requested from an image server 116 that provides an image 104 to a user device 102 when the user device 102 communicates with the image server 116 to request the image 104. For example, the map server 110 can be a web server (e.g., data processing apparatus), and the image server 116 can be a web server.

The image 104 can also be requested in association with the delivery of a map 106 in response to a user device 102 requesting the map 106 from a map server 110. For example, the image 104 can be included within the map 106, e.g., as a portion of the map 106 as displayed on the user device 102. For example, the image 104 can be received by the map server 110, and the map server 110 can incorporate the image 104 into the map 106 provided to the user device 102. For example, the image 104 could be an icon intended for use within the context of a map, e.g. a marker for indicating a point of interest shown on the map 106. The image 104 can be incorporated into the map 106 by rendering the image 104 on top of the map 106 when the map 106 is displayed, modifying the map 106 prior to display to include the image 104, blending the image 104 with the map 106, or by another method of incorporation.

In some examples, the map 106 is generated in advance of any request, for example, generated by the map server 110 and retained in storage until requested by a user device 102. In some examples, the map 106 is generated subsequent to a request to deliver the map 106. In some examples, the image 104 can be received by the map server 110 when the map 106 is generated, or the image 104 can be received by the map server 110 after the map 106 is generated. The image 104 need not be incorporated into the map 106 at the time the map 106 is generated. In some examples, the map server 110 receives the image 104 by accessing a uniform resource locator (URL) provided to the map server 110 and associated with the image 104.

Figure 2:
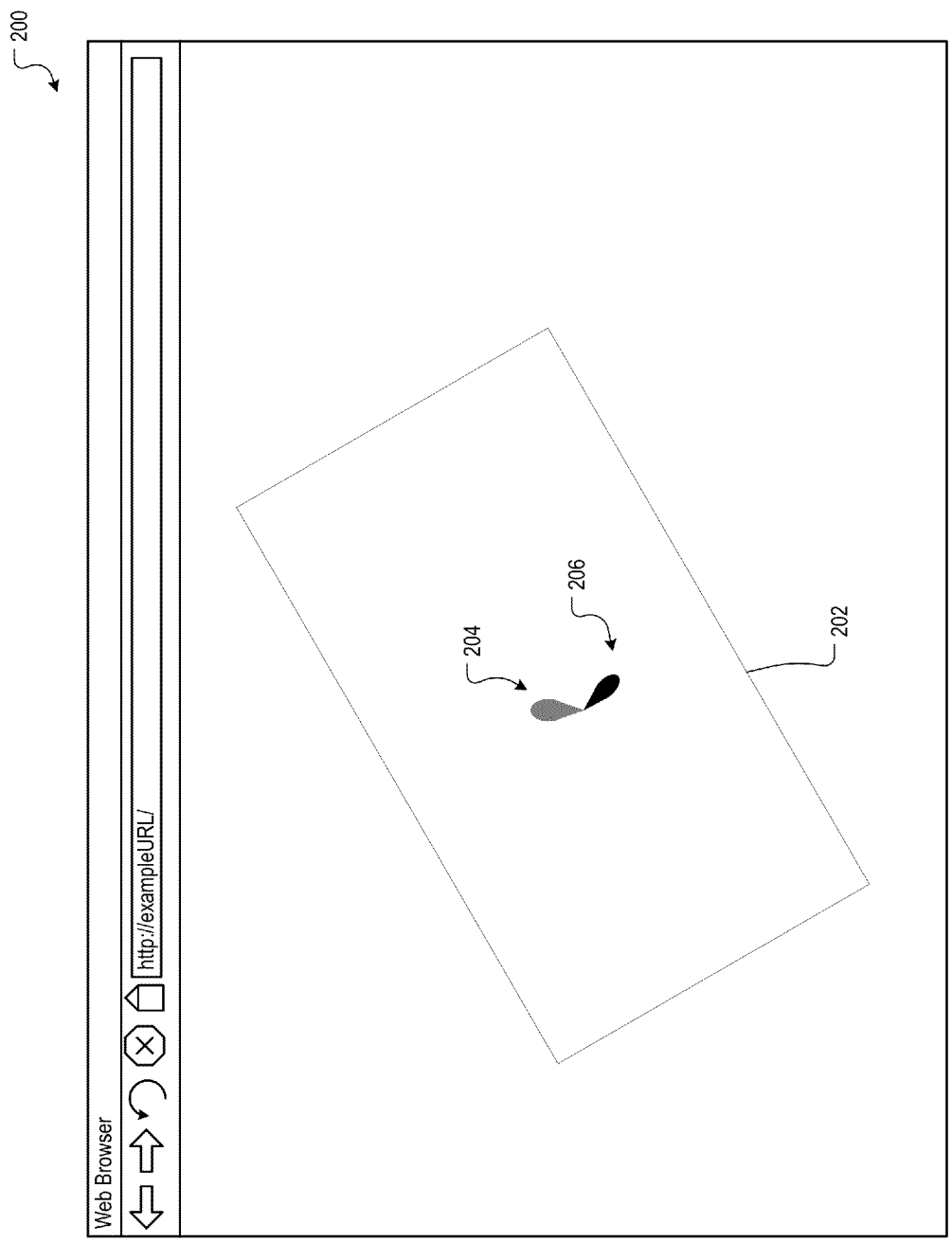
FIG. 2 is an example graphical user interface presenting a map.

FIG. 2 is an example graphical user interface presenting a map 202. Here, the graphical user interface includes a web browser 200. An image representing a marker 204 is incorporated within the map. The map 202 is presented as a two-dimensional (2-D) plane, but a 3-D appearance can be simulated with the use of visual enhancements. For example, the map 202 can be presented at an angle to simulate perspective, as if it were a physical 3-D map laid upon a flat surface. The marker 204 can serve as an indicator of a location on the map 202. For example, the marker 204 may indicate a starting point, a destination, a point of interest, or another kind of location. Further, the marker 204 can be made to look as though it is on a different plane than the map 202, as if the marker 204 were a physical object hovering over a flat map in the third dimension, by displaying a shadow 206 projected onto the map 202. The shadow 206 is projected onto the map 202 in a way that it appears to be cast onto the surface of the map by an unseen light source present in 3-D space.

Figure 3:
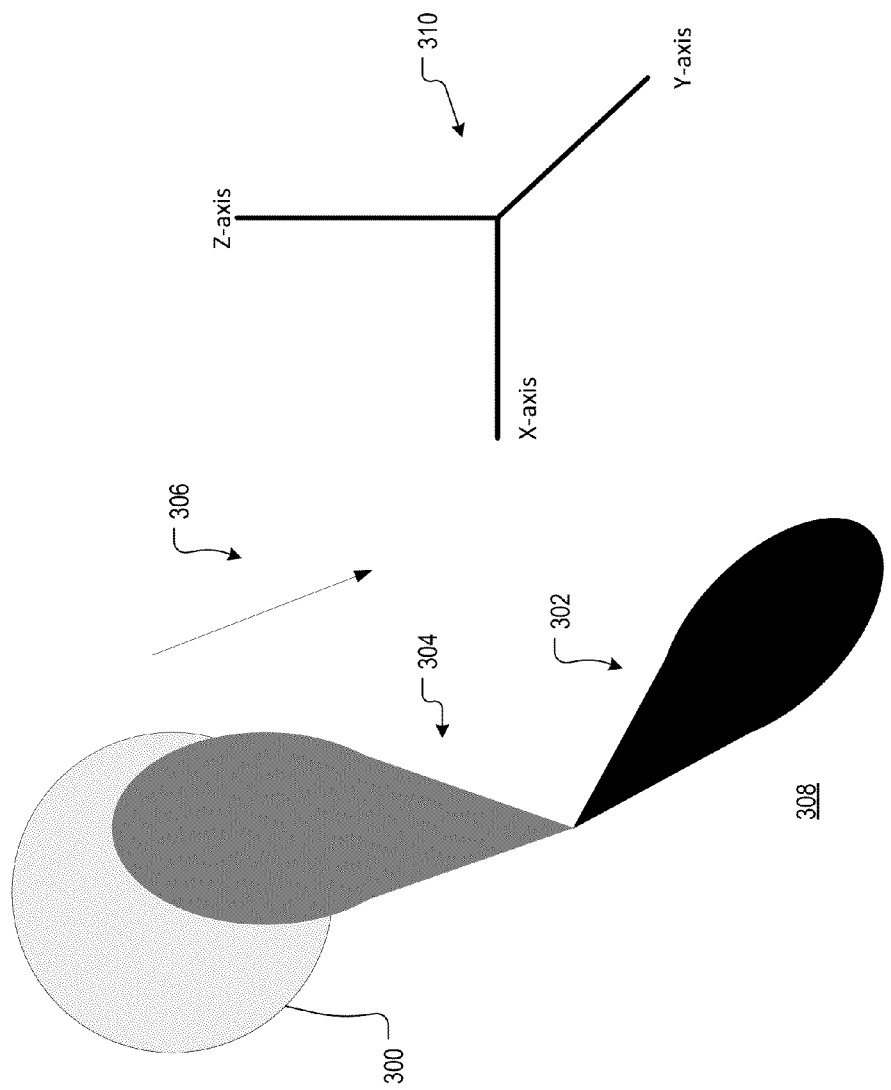
FIG. 3 shows an example modeled light source casting a shadow on a marker in 3-D.

FIG. 3 shows an example modeled light source 300 casting a shadow 302 on a marker 304 in 3-D. Axes of a Cartesian coordinate system 310 are indicated for reference. The light source 300 can be a simulation of an object that generates light such as the sun or a light bulb, for example. The light source 300 generates light that shines in a direction 306 toward the marker 304. In this model, the light causes the marker 304 to cast the shadow 302 upon a 3-D surface 308, for example, the simulated 3-D surface of a map.

In various implementations, different computational techniques can be used to generate the shadow 302 in a way that it appears to be cast by light emitted by the light source 300 and intercepted by the marker 304.

Figure 4B:
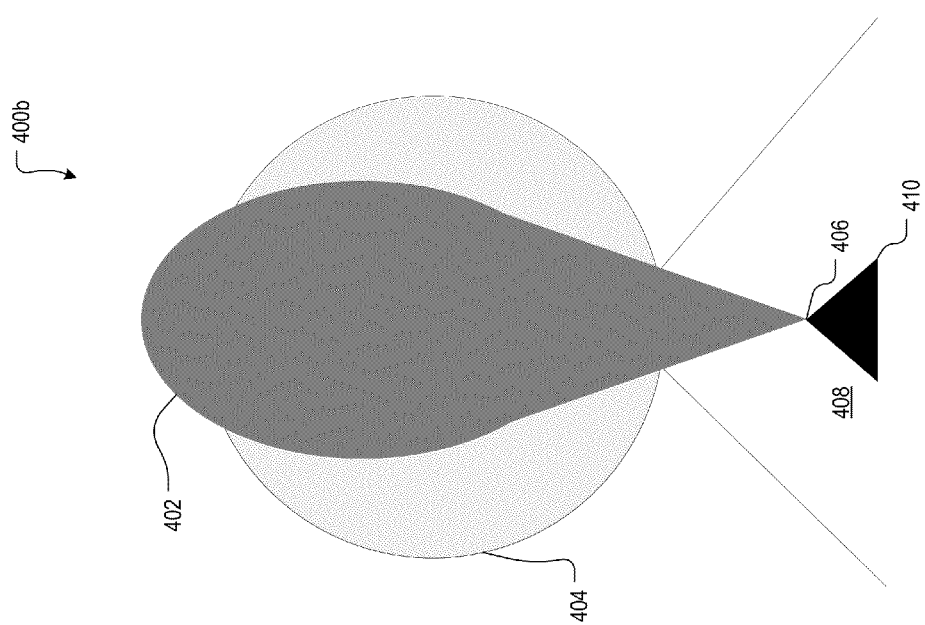
FIGS. 4A and 4B show views of an example light source partially obscured by a marker.
Figure 4A:
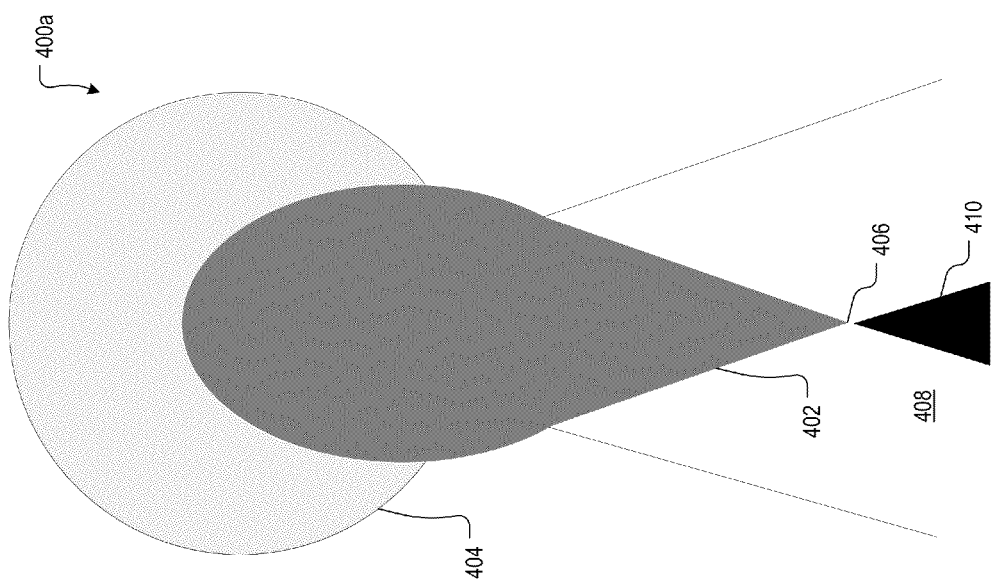

One computational technique can determine the intensity (brightness) of a shadow at different points on a simulated flat surface. FIGS. 4A and 4B show views 400a, 400b of an example light source 404 partially obscured by a marker 402. The views 400a, 400b are shown from the perspective of two points on a flat surface 408 substantially perpendicular to the marker 402 such that the lower tip 406 of the marker 402 contacts the surface 408. A shadow is cast upon the surface when the marker 402 interrupts light emitted from the light source 404.

The views 400a, 400b are generated by projecting the marker 402 and the light source 404 in 3-D space using an affine transformation. An affine transformation can be performed by scaling an image (e.g., the marker 402 or the light source 404). For example, an image can be made to appear closer to a point of view by enlarging it, and an image can be made to appear farther away from a point of view by shrinking it. An affine transformation can also performed by translating (e.g., moving) an image. For example, an image can be made to appear to the left of a viewpoint by translating the image to the left, and an image can be made to appear to the right of a viewpoint by translating the image to the right. Translation can also include rotation of the image. Affine transformations can be accomplished through matrix operations (e.g., operations on a matrix of discrete elements such as pixels).

FIG. 4A shows the marker 402 and light source 404 as viewed from the perspective of a point on the surface 408 a distance away from the lower tip 406 of the marker 402. FIG. 4B shows the marker 402 and light source 404 as viewed from the perspective of a point on the surface 408 closer to the lower tip 406 of the marker 402 as compared to the view shown in FIG. 4A. In FIG. 4B, the light source 404 appears lower in 3-D space compared to FIG. 4A because of the changed 3-D relationship between the marker 402, the light source 404, and the point of view. Further, a different quantity of area of the light source 404 is obscured in FIG. 4B relative to FIG. 4A. As a result, a different amount of light is interrupted by the marker 402 in the two views, and so the intensity of the shadow 410 at the point on the surface 408 represented by FIG. 4A is different from the intensity of the shadow 410 at the point on the surface 408 represented by FIG. 4B. At a particular point the quantity of the area of the light source 404 obscured by the marker 402 and the quantity of the area of the light source 404 not obscured by the marker 402 can be used to calculate the intensity of the shadow at that particular point.

Figure 5B:
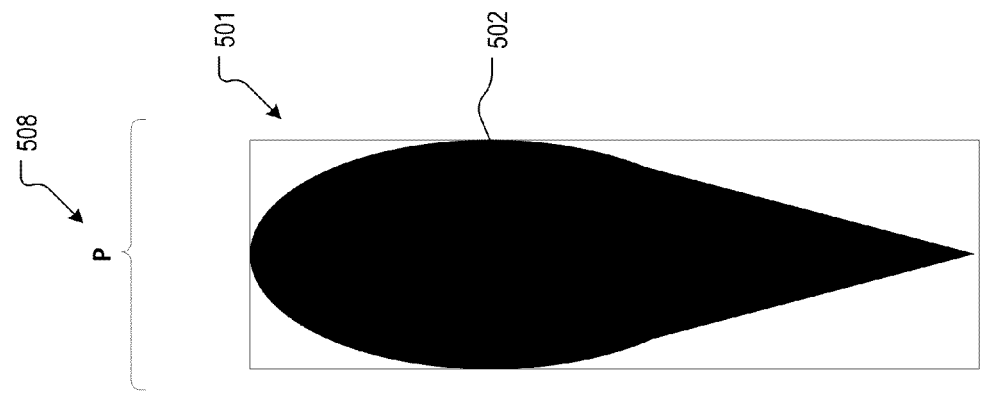
FIGS. 5A and 5B represent the generation of a shadow cast by an example marker.
Figure 5A:
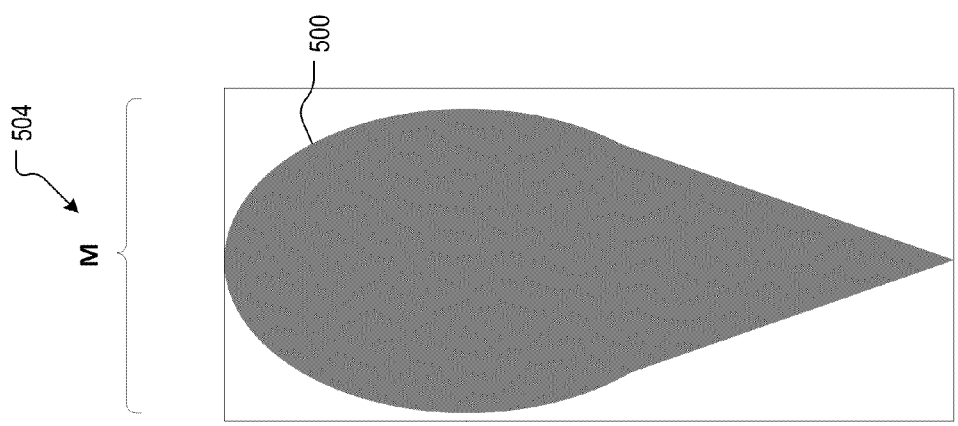

FIGS. 5A and 5B represent the generation of a shadow 502 cast by an example marker 500. For example, the shadow 502 can be cast upon a flat surface such as a representation of a map. The system 100 can extract the transparency channel of the marker 500 and then perform one or more affine transformations on the transparency channel to project the marker 500 into 3-D space. A transparency channel of an image (e.g., the marker 500) represents information about which portions of the image are transparent and which portions are opaque. The transparency channel of the marker 500 can be computed by removing the hue (color) of the pixels of the marker 500. The affine transformation can be performed in the manner described above with respect to FIGS. 4A and 4B, for instance. By way of illustration, the affine transformation is performed on the transparency channel because the information not included in the transparency channel, such as hue, is not used in generating a shadow 502.

In the example shown in FIG. 5A, the marker 500 has a width 504 of quantity M pixels, and a height 506 of quantity N pixels. The system 100 can use this information to generate a pixel field 501 that will be partially filled in by pixels representing the shadow 502. In some examples, because a shadow generally has no hue, the pixels of the pixel field 501 will also have no hue (referred to as grayscale). The pixels of the pixel field 501 may be capable of incorporating hue information, but the hue may not be used. In some examples, the pixels of the pixel field are the same size as pixels of the marker 500. The dimensions of the pixel field 501 are based on the dimensions of the marker 500. One dimension, the height 510, has the same quantity of N pixels as the marker 500. One dimension of the pixel field 501, the width 508, has been reduced to a quantity of P pixels, thus narrowing the shape of the shadow 502 relative to the shape of the marker 500. The value of P can depend on the angle of the shadow 502 relative to the marker 500 and a light source (not shown) when rendered in 3-D space. The angle of the shadow 502 can be chosen based on factors such as aesthetics. For example, one angle of the shadow 502 that can be used is 60 degrees. The value of P can be determined, for example, by equation 1:

$$P = M + N * \sin(\text{shadow angle}) \quad \text{Equation 1}$$

The intensity (brightness) of the pixels in the shadow 502 can be determined by calculating an intensity value for each pixel of the shadow. In some implementations, the area of a light source exposed from the point of view of a particular pixel can be used to calculate the intensity value for that pixel.

Figure 6B:
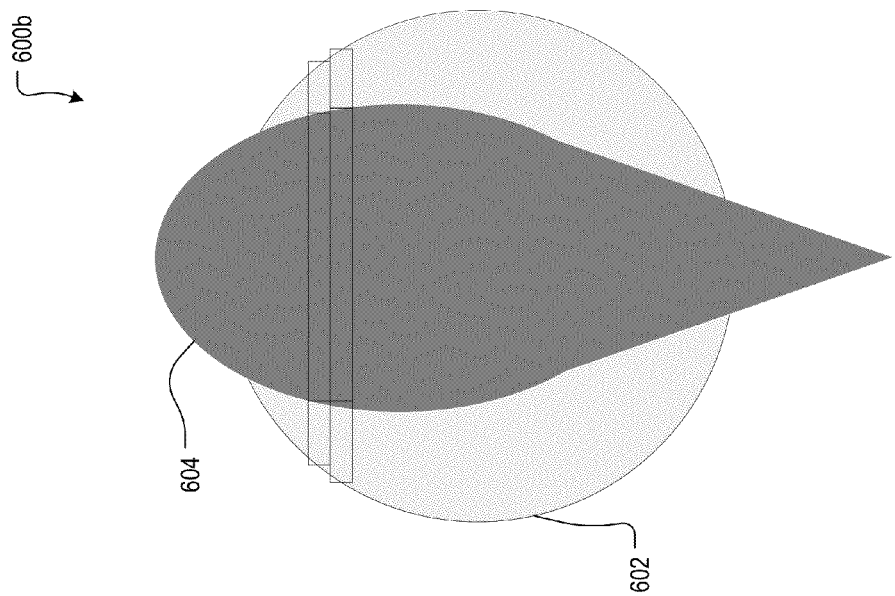
FIGS. 6A and 6B demonstrate an example technique for determining the intensity value for two pixels of a shadow, respectively.
Figure 6A:
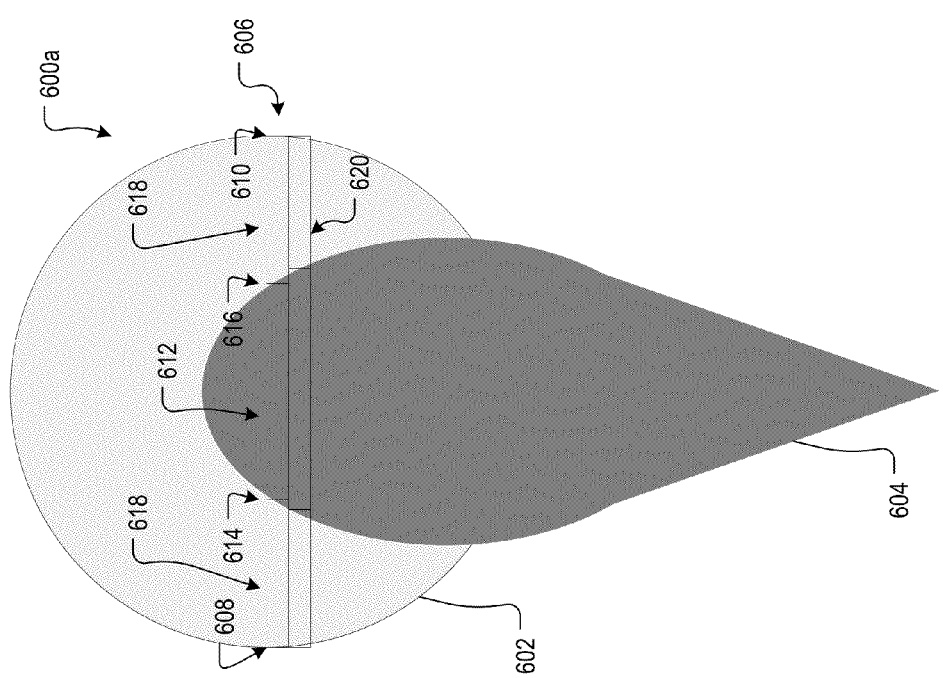

FIGS. 6A and 6B demonstrate an example technique for determining the intensity value for two pixels of a shadow, respectively. The determination is based on the area of a light source exposed from the point of view of those pixels. For example, this technique can be used to generate the shadow 502 in the pixel field 501 shown in FIG. 5B.

Each figure represents a viewpoint 600a, 600b from the perspective of two pixels. In both figures, a light source 602 is partially obscured by a marker 604 from the viewpoint 600a, 600b of each pixel. The light source 602 and marker 604 are both rendered in simulated 3-D space by extracting the transparency channel of each and performing an affine transformation upon each to properly place the light source 602 and the marker 604 relative to the viewpoints 600a, 600b.

The portion of the light source 602 visible to the pixel can be used to calculate the intensity value. If a larger portion of the light source 602 is visible, the intensity value will be greater because more light illuminates the pixel. If a smaller portion of the light source 602 is visible, the intensity value will be lesser because less light illuminates the pixel. In some implementations, the intensity value has a linear correlation to the portion of the light source 602 that is visible. For example, if 50% of the light source 602 is visible to a particular pixel, that pixel will have an intensity value of 50%. As another example, if 0% of the light source 602 is visible to a particular pixel, that pixel will have an intensity value of 0%.

Each of the light source 602 and the marker 604, and the transparency channels thereof, are images themselves composed of pixels. In the context of image processing described here, the light source 602 and the marker 604 both function each as a matrix of pixels.

The portion of the light source 602 that is visible can be calculated efficiently by computing a run-length encoding of the light source 602 and a run-length encoding of the marker 604, and comparing the two run-length encodings. A run-length encoding is a description of data in which sequences of the same data value are stored as a single data value indicating where the sequence begins and ends. For example, a run-length encoding can be used to store information about the beginning and end of a portion of pixels within an image. A run-length encoding can be used in some implementations since information about the presence or absence of pixels of the light source 602 and the pixels of the marker 604 can be used to compute the intensity value of a shadow pixel. Other information about the pixels of the light source 602 and the pixels of the marker 604, such as hue, need not be used in the computation of intensity value and is not reflected in a run-length encoding. Other types of encoding are possible.

As shown in FIG. 6A, a computer system generating a shadow can examine a row 606 of pixels that make up a portion of the light source 602 and identify the boundaries 608, 610 of the row 606 based on the location of the pixels. The computer system can also examine a row 612 of pixels that make up a portion of the light source 602 and compute the boundaries 614, 616 of that row 612. The computer system can then use the location of the boundaries 608, 610, 614, 616 to identify the portion 618 of the row that has visible pixels of the light source 602, not obscured by the marker 604.

This process can be carried out for other rows 620 of pixels until the total number of visible pixels of the light source 602 has been determined. The number of visible pixels of the light source 602 is proportional to the intensity of the corresponding pixel of the shadow.

FIG. 6B shows the viewpoint 600b of another pixel of the shadow. From this viewpoint 600b, a different portion of the light source 602 is visible behind the marker 604. The portions of the rows that have visible pixels of the light source 602, not obscured by the marker 604, can be calculated in the same manner as described above with respect to FIG. 6A to determine the total number of visible pixels of the light source 602 and the intensity of the corresponding pixel of the shadow.

FIG. 7 is a flowchart of an example technique 700 for generating a shadow from a marker image. The technique 700 can be used, for example, by the map server 110 of FIG. 1 to generate a shadow for an image 104 to be included on a map 106.

At stage 702, a map server receives an icon, e.g., a marker image for use with a map. The map server also receives a light source image that will be used to generate a shadow of the icon. For example, the map server may receive the icon by accessing a URL provided to the map server and associated with the icon.

At stage 704, the map server extracts the transparency channel of the icon by removing the hue (color) of the pixels of the icon. The map server can also extract the transparency channel of the light source.

At stage 706, the map server applies an affine transformation to the transparency channel of the icon to position the icon in simulated 3-D space. The map server can also apply an affine transformation to the transparency channel of the light source to position the light source relative to the icon.

At stage 708, the map server generates a field of pixels that will be used to represent the shadow cast by the icon. The field of pixels is sized based on the dimensions of the icon.

At stage 710, the map server fills in the field with pixels of varying intensity (brightness). For each pixel in the field, the map server computes a portion of the light source visible by subtracting rows of pixels of the icon from rows of pixels of the light source image. The intensity of the pixel of the field is proportional to the portion of the light source visible to that pixel. This stage is performed for each pixel of the field.

At stage 712, the map server integrates the icon and the shadow with the map for display on a computer screen.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method implemented by data processing apparatus, the method comprising:
   identifying a two-dimensional image representing an icon and a two-dimensional image representing a light source;
   applying an affine transformation to a transparency channel of the image representing the icon, the affine transformation projecting pixels of the transparency channel into three-dimensional space; and
   generating a field of pixels representing a shadow cast by the icon by
      computing a portion of the light source that is visible to pixels of the field by subtracting rows of a matrix that represents the affine transformation from rows of a matrix that represents a transparency channel of the light source image, wherein subtracting the rows of the affine transformation from the rows of the transparency channel of the light source image comprises computing first run-length encodings based at least partly on rows of the matrix representing the transparency channel of the light source image and computing second run-length encodings based at least partly on rows of the matrix representing the affine transformation, and
      computing brightness of each of the generated pixels of the field based at least partly on the computed portion of the visible light source.

2. The method of claim 1, further comprising computing the first run-length encodings and the second run-length encodings each a number of times equal to a number of pixels in the field.

3. The method of claim 1 wherein the field of pixels comprises a matrix comprising a number of rows equal to a number of rows in the matrix representing the affine transformation.

4. The method of claim 1 wherein computing the brightness of each of the generated pixels of the field based at least partly on the computed portion of the visible light source comprises assigning a brightness value to each pixel of the field.

5. The method of claim 1 wherein identifying the image comprises receiving the image from a location specified by a uniform resource locator (URL).

6. A system, comprising:
   a data processing apparatus; and
   a memory coupled to the data processing apparatus having instructions stored thereon which, when executed by the data processing apparatus cause the data processing apparatus to perform operations comprising:
   identifying a two-dimensional image representing an icon and a two-dimensional image representing a light source;
   applying an affine transformation to a transparency channel of the image representing the icon, the affine transformation projecting pixels of the transparency channel into three-dimensional space; and
   generating a field of pixels representing a shadow cast by the icon by
      computing a portion of the light source that is visible to pixels of the field by subtracting rows of a matrix that represents the affine transformation from rows of a matrix that represents a transparency channel of the light source image, wherein subtracting the rows of the affine transformation from the rows of the transparency channel of the light source image comprises computing first run-length encodings based at least partly on rows of the matrix representing the transparency channel of the light source image and computing second run-length encodings based at least partly on rows of the matrix representing the affine transformation, and
      computing brightness of each of the generated pixels of the field based at least partly on the computed portion of the visible light source.

7. The system of claim 6, further comprising computing the first run-length encodings and the second run-length encodings each a number of times equal to a number of pixels in the field.

8. The system of claim 6 wherein the field of pixels comprises a matrix comprising a number of rows equal to a number of rows in the matrix representing the affine transformation.

9. The system of claim 6 wherein computing the brightness of each of the generated pixels of the field based at least partly on the computed portion of the visible light source comprises assigning a brightness value to each pixel of the field.

10. The system of claim 6 wherein identifying the image comprises receiving the image from a location specified by a uniform resource locator (URL).

11. Computer readable media storing software comprising instructions executable by a processing device and upon such execution cause the processing device to perform operations comprising:
 identifying a two-dimensional image representing an icon and a two-dimensional image representing a light source;
 applying an affine transformation to a transparency channel of the image representing the icon, the affine transformation projecting pixels of the transparency channel into three-dimensional space; and
 generating a field of pixels representing a shadow cast by the icon by
  computing a portion of the light source that is visible to pixels of the field by subtracting rows of a matrix that represents the affine transformation from rows of a matrix that represents a transparency channel of the light source image, wherein subtracting the rows of the affine transformation from the rows of the transparency channel of the light source image comprises computing first run-length encodings based at least partly on rows of the matrix representing the transparency channel of the light source image and computing second run-length encodings based at least partly on rows of the matrix representing the affine transformation, and
  computing brightness of each of the generated pixels of the field based at least partly on the computed portion of the visible light source.

12. The computer readable media of claim 11, further comprising instructions that cause the processing device to perform operations comprising computing the first run-length encodings and the second run-length encodings each a number of times equal to a number of pixels in the field.

13. The computer readable media of claim 11 wherein the field of pixels comprises a matrix comprising a number of rows equal to a number of rows in the matrix representing the affine transformation.

14. The computer readable media of claim 11 wherein computing the brightness of each of the generated pixels of the field based at least partly on the computed portion of the visible light source comprises assigning a brightness value to each pixel of the field.

15. The computer readable media of claim 11 wherein identifying the image comprises receiving the image from a location specified by a uniform resource locator (URL).

* * * * *